United States Patent
Reddy et al.

(10) Patent No.: US 12,438,722 B1
(45) Date of Patent: Oct. 7, 2025

(54) CROSS-PLATFORM ACCESS CONTROL

(71) Applicant: Citibank, N.A., New York, NY (US)

(72) Inventors: Umesh Reddy, Irving, TX (US); Akash Gujarathi, Irving, TX (US); Bhavana Nagavarapu, Irving, TX (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/075,453

(22) Filed: Mar. 10, 2025

(51) Int. Cl.
*H04L 9/32* (2006.01)
*H04L 9/30* (2006.01)

(52) U.S. Cl.
CPC .......... *H04L 9/3213* (2013.01); *H04L 9/3073* (2013.01)

(58) Field of Classification Search
None
See application file for complete search history.

(56) References Cited

U.S. PATENT DOCUMENTS

| | | | |
|---|---|---|---|
| 2014/0082366 A1* | 3/2014 | Engler | H04L 9/3242 713/181 |
| 2018/0337914 A1* | 11/2018 | Mohamad Abdul | H04L 9/3213 |
| 2021/0157896 A1* | 5/2021 | Hashmi | G06F 21/41 |
| 2022/0006801 A1* | 1/2022 | Jankowski | H04L 63/0807 |
| 2022/0191185 A1* | 6/2022 | Carmon | H04L 63/20 |

\* cited by examiner

*Primary Examiner* — Taghi T Arani
*Assistant Examiner* — Joshua Raymond White
(74) *Attorney, Agent, or Firm* — Perkins Coie LLP

(57) ABSTRACT

Systems and methods for cross-platform authorization are disclosed herein. A system may receive, at a server, a request to generate an authorization token for a service. The request may include an indication of a service public key and an encrypted service account token. The system may decrypt, using a second service key, the encrypted service account token into a service account token. The system may then generate a service identity for the service and a key identifier and an access key pair that includes a private and public access key. The system may generate a service identity token and a server token that includes access permissions for the service. The system may then encrypt the server token and the service identity token using the second service key into an encrypted usage token and transmit the encrypted usage token.

16 Claims, 7 Drawing Sheets

```
subroutine_encrypt_service_token(){
    (private_key, public_key) = generate_keypair();
    transmit_public_key(public_key);
    message = await channel.recv();
    if (message != null){
        //server (public key, private key) = keypair generated at server using public_key as seed
        (server_public_key) = message;
        //Create a AES key based on client_pvt_key & server_pub_key
        AES_key = generate_key(private_key, server_public_key)
        //fetch the service_account token
        service_account_token = fetch();
        //encrypt with AES key
        encrypted_service_account_token = encrypt(service_account_token, server_public_key;
    }
    return encrypted_service_account_token;
}
```

*FIG. 3A*

```
subroutine_generate_second_service_key(){
    //Fetch AES key based on client_pub_key (e.g., public key from service platform)
    try:
        AES_key = fetch();

//Create AES key based on client_pub_key (e.g., public key from service platform)
    //should be the same as AES independently generated on service platform
    except:
        AES_key = generate_key(server_private_key, client_pub_key);
        //cache AES key based on client pub key
        cache(AES_key, client_pub_key);

//4.4.2 If AES key not available, create EC keypair with client_pub seed
    except:
        (server_private_key, server_public_key) = generate_keypair(client_pub_key);
        transmit_public_key(server_public_key);
        //Generate AES based of client pub key & server pvt key
        AES_key = generate_key(server_private_key, client_pub_key);
        //cache AES key based on client pub key
        cache(AES_key, client_pub_key);
        //next run decrypt to decrypt token with AES key corresponding to client_pub_key
}
```

*FIG. 3B*

```
service_identity_token{
        service_identity{
                cluster_identifier: "cluster_3"
                name_space: "my-name-space"
                deployment_name: "e-commerce service"
        }
        private_access_key: "1k2wnduxhaisHIUDH"
        key_identifier: "key_34"
}
```

*FIG. 4A*

```
usage_token{
        service_identity_token{
                service_identity{
                        cluster_identifier: "cluster_3"
                        name_space: "my-name-space"
                        deployment_name: "e-commerce service"
                }
                private_access_key: "1k2wnduxhaisHIUDH"
                key_identifier: "key_34"
        }
        server_token{
                typ: "JWT"
                name: "entity_2"
                permissions: ['read', 'write', 'delete']
        }
}
```

*FIG. 4B*

CROSS-PLATFORM ACCESS CONTROL

BACKGROUND

In recent years, use of various computing environments has become widespread. For example, use of on-premises environments in combination with cloud environments has become common. However, interoperability between these different environments may be difficult to accomplish due to different authorization and authentication mechanisms. For example, on-premises environments may be controlled by internal technology departments with credentials given out for appropriate users. Cloud environments may be controlled by technology vendors with credentials supplied differently. This problem may be exacerbated where services are involved. For example, one service may use data supplied by another service. If one of the services is in the cloud and the other service is on premises, it may be very difficult to authorize the other service to request data.

SUMMARY

Accordingly, a mechanism is disclosed herein for cross-platform authorization and authentication. An authorization system may be used to perform operations described herein. In particular, a server (e.g., an authorization server) may receive an authorization request to generate an authorization token for a service. The authorization request may include an indication of a service public key associated with the service and an encrypted service account token associated with the service. Furthermore, the encrypted service account token may be generated by encrypting a service account token using a first service key. The first service key may be generated based on a client private key and a server public key. In addition, the client private key may be associated with a requesting device hosting the service. The requesting device may be an end user device or another server hosting the service.

One example to describe the environment may include a cloud service that interfaces with user devices needing information from an on-premises service. In particular, a mobile device may be executing an application that displays, to the user, account information. The mobile device may be communicating with the cloud environment and in particular with a server within the cloud environment (sometimes referred to as a requesting device). The requesting device may execute a service that may generate a request for user account information. The request may be directed to another service which resides on premises. Before this request is made/performed, either one of or both authorization and authentication need to be performed. Thus, disclosed herein is a mechanism for enabling authorization between different environments (e.g., an on-premises environment and a cloud environment). Thus, the authorization request may be a request to initiate an authorization enablement protocol so that the requesting service is able to be eventually authenticated when requesting data.

When the requesting device receives the authorization request, the server may decrypt, using a second service key, the encrypted service account token. The second service key may be one that is generated based on a client public key associated with the requesting device hosting the service and a server private key associated with the server. For example, the second service key may be generated using Elliptic-Curve-Diffie-Hellman (ECDH) and the requesting device may have generated the same service key independently when encrypting the service account token in the request.

Once the encrypted service account token is decrypted, the service account information from the token can be used to generate a service identity. That is, based on the service account information, such as what entity owns and deploys the service, permissions on the service, etc., the server can put together a service identity that includes information needed to authenticate the service within a cluster and with external services. For example, the server can generate a service identity including a cluster identifier, a name space, and a deployment name. These can be obtained, for example, from the service account token. The server can generate, for the service identity, a key identifier and an access key pair comprising a private access key and a public access key.

The requesting device may then generate a service identity token which includes the service identity, the private access key, and the key identifier reformatted in a token format. By doing so, the requesting device makes the token easily ingestible by various platforms. Similarly, when the requesting device is a server hosting the service, the server may generate a server token. For example, the server token may include data such as access permissions specifying what entities (e.g., other services) or users may access either one of or both the service and the service data. In particular, the permissions can include permissions to execute programs or read, write, or delete data from the service. The server token and service identity token may be enjoined into a usage token which may then be encrypted using the second service key to form an encrypted usage token. The server may then transmit the encrypted usage token to the requesting device.

Various other aspects, features, and advantages of the system will be apparent through the detailed description and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), of a given item (e.g., data), unless the context clearly dictates otherwise.

BRIEF DESCRIPTION OF THE DRAWINGS

FIG. 3A illustrates an exemplary process for encrypting a service account token, such as can be performed by a service platform prior to an authorization request, in accordance with one or more embodiments of this disclosure.

FIG. 3B illustrates an exemplary process for generating a second service key, in accordance with one or more embodiments of this disclosure.

FIG. 4A illustrates an exemplary service identity token for cross-platform authorization, in accordance with one or more embodiments of this disclosure.

FIG. 4B illustrates an exemplary usage token for cross-platform authorization, in accordance with one or more embodiments of this disclosure.

DETAILED DESCRIPTION

Figure 1:
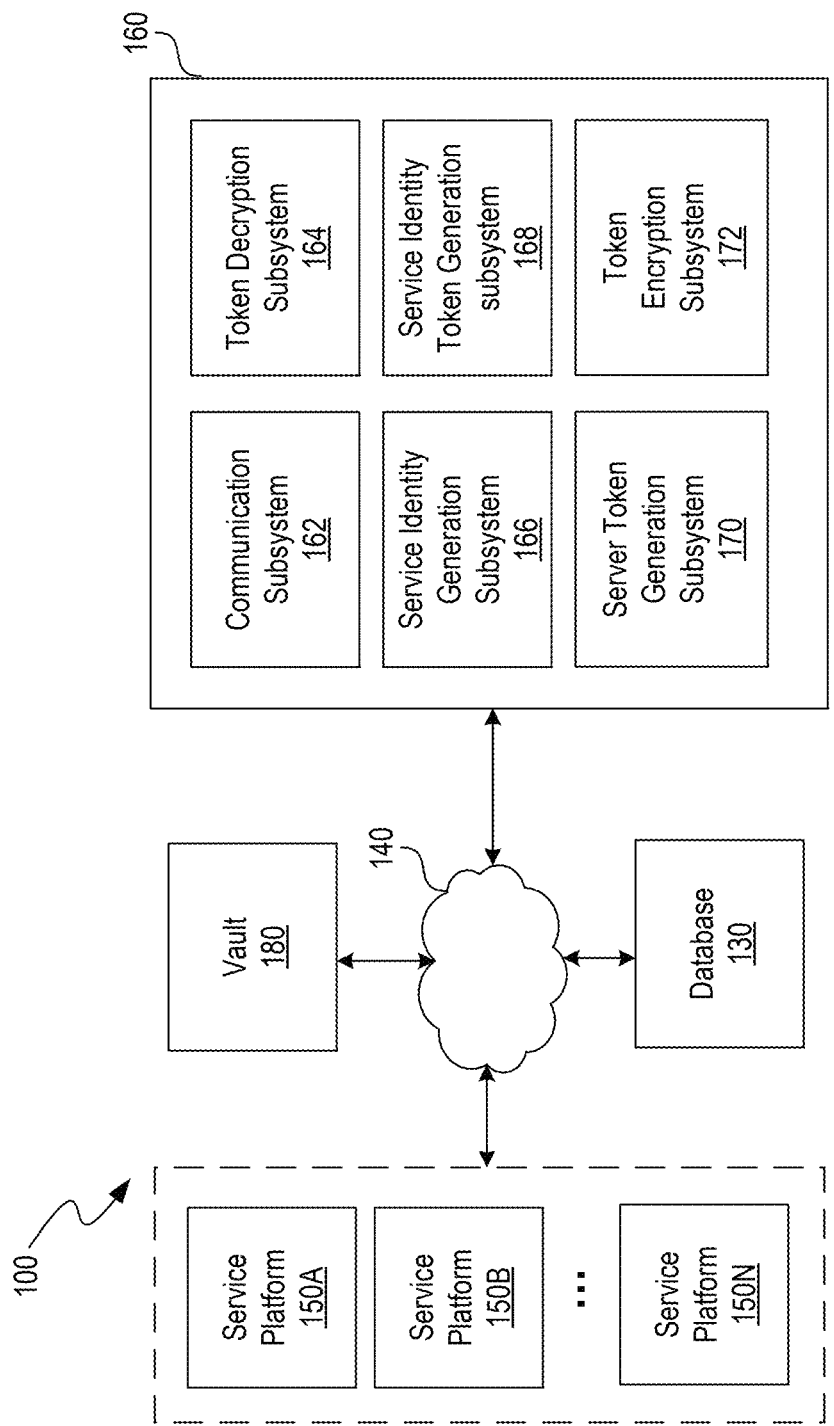
FIG. 1 shows an illustrative system for cross-platform authorization, in accordance with one or more embodiments of this disclosure.

In the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Attempting to create a system to enable interoperability between different environments in view of the available conventional approaches created significant technological uncertainty. For example, as described herein, especially where various platforms use different authentication protocols controlled by rigorous standards set by individual services, there is presently no good method for providing authentication or authorization across various different service platforms. Creating a process that enabled authentication across various incompatible platforms required addressing several unknowns in conventional approaches for security and authorization, such as the latency and bottlenecks created when large amounts of data are subjected to various protocols when requested by different services. Typically, conventional approaches to service-to-service data transfer where services are incompatible or simply use different authorization protocols cause errors and introduce a high level of latency, throughput bottleneck, and suboptimal execution time. For example, since authentication protocols are different, requests for data often fail and delays can be introduced. Because of the delay, conventional methods are often not scalable and introduce network congestion when the volume of data transmitted increases between services.

In order to mitigate this, some conventional systems rely on insecure authorization, enabling a consumer service to subscribe to a producer service to access its resources. For example, many services bypass security mechanisms to overcome this issue or create independent gateways or custom proxies between services to translate authentication methods. This not only requires more computational expenditure and is time-inefficient, but this conventional method also alienates services run by smaller clients who may not have the resources and framework to do so. Furthermore, because these methods do not solve the issue of separate authentication systems, fragmented identity management becomes an issue in conventional systems, which leads to difficulties in auditing access logs and enforcing consistent security policies, such as required by some regulations or entities. Conversely, the disclosed system incorporates centralized authorization policy enforcement while supporting real-time decision points, which mitigates the issues caused by separate authentication systems.

Additionally, as described herein, latency created further technological uncertainty, since the legacy systems often introduced latency and bottlenecks as described herein. To successfully overcome this issue, the inventors attempted various different methods for mitigating latency, including by caching keys and tokens most recently used in order to reduce the need to repeatedly perform expensive computations, database lookups, or external API calls. Instead, by having immediate access to those authentication credentials frequently used, the system can reduce duplicative resources expended when requesting data from external vaults or databases.

To overcome the technological uncertainties with enabling security for each service in their specific method, the inventors systematically evaluated multiple design alternatives. For example, the inventors attempted different architectures and encryption methods. The inventors attempted a combination of Rivest-Shamir-Adleman (RSA) and ECDH, which enabled security between the centralized platform and the individual services. The architecture described herein also allowed the inventors to identify a method which enabled individual services to execute their own security protocols, e.g., by using information transmitted in the tokens to implement security protocols and permissions specific to the service.

Thus, the inventors experimented with different methods for security and interoperability. For example, the inventors attempted various methods for increasing efficiency, such as different storage methods (e.g., caching) and architectures (e.g., fragmented, centralized) in order to overcome issues in mediating incompatible security protocols among services.

Techniques are disclosed herein for enabling cross-platform access. In particular, as described herein, interoperability between differing environments among service platforms may be difficult to accomplish due to different authorization and authentication protocols and schemes. Thus, the environment 100 is an illustrative system that can be used for mediating between different access protocols between platforms. For example, environment 100 may be used to enable various service platforms to subscribe to a producer service to access its resources. Each service platform may be issued an identity token (e.g., in the form of a JSON Web Token (JWT)) by an authorization server, which can be used downstream to verify the service's identity and thus access resources. For example, environment 100 illustrates exemplary platforms for various services, such as service platform 150A, service platform 150B, and service platform 150N. Environment 100 may further include database 130, vault 180, and cross-platform access system 160.

Cross-platform access system 160 of environment 100 may execute instructions for performing operations for enabling access across different platforms. Cross-platform access system 160 may include several subsystems, each configured to perform one or more steps of the methods described herein, such as communication subsystem 162, token decryption subsystem 164, service identity generation subsystem 166, service identity token generation subsystem 168, server token generation subsystem 170, and token encryption subsystem 172. Cross-platform access system 160 may include software, hardware, or a combination of the two. For example, cross-platform access system 160 may be hosted on a physical server or a virtual server that is running on a physical computer system. In some embodiments, cross-platform access system 160 may be configured on a user device (e.g., a laptop computer, a smartphone, a desktop computer, an electronic tablet, or another suitable user device).

As described herein, cross-platform access system 160 may be used to facilitate access across various platforms. In particular, cross-platform access system 160 may be in communication (e.g., via communication network 140) with a plurality of different service platforms, which may be executed or accessed through service platform devices associated with the service platforms. In the example of environment 100, cross-platform access system 160 is illustrated to be in communication with service platform 150A, service platform 150B, and service platform 150N through communication network 140. As described herein, a service platform may be referred to herein as a digital or physical infrastructure that provides a set of services, tools, or capabilities to entities (e.g., individual users, businesses, developers, etc.). These platforms may facilitate interactions such as transactions, as well as various functionalities. For example, a service platform may include cloud computing platforms, payment processing platforms, social media platforms, e-commerce platforms, and Internet of Things (IoT) platform such as smart home systems, and industrial automation platforms.

Figure 2:
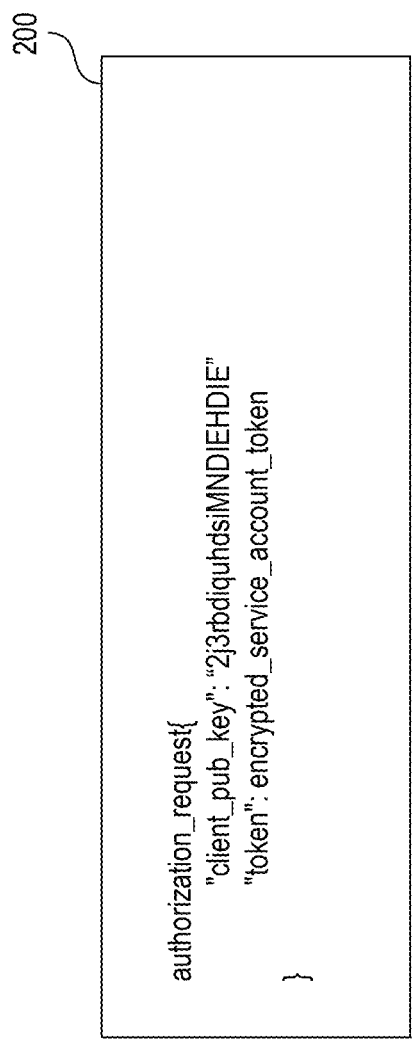
FIG. 2 illustrates an exemplary authorization request, e.g., for cross-platform authorization, in accordance with one or more embodiments of this disclosure.

Each service platform may request an authorization token to be generated for a service so that the service platforms may use the authorization token (also referred to herein as a usage token) downstream to authenticate the service and gain access to resources, e.g., protected resources such as Personally Identifiable Information (PII). For example, FIG. 2 illustrates an exemplary authorization request 200 to generate an authorization token for a service. For example, service platform 150A may generate authorization request 200 and transmit the request via communication network 140 to the cross-platform access system 160 using communication subsystem 162.

Authorization request 200 includes a public key specific to the service, "client_pub_key" as well as an encrypted service account token associated with the service. The service platform (e.g., service platform 150A) may generate the authorization request such as through an exemplary process 300 for encrypting a service account token and generating a public key (e.g., client_pub_key) during the process, as illustrated in FIG. 3A. For example, the service platform 150A may perform steps of a function "subroutine_encrypt_service_token( )" of process 300. In particular, the process includes generation of a keypair, e.g., "(private_key, public_key)=generate_keypair( )".

The keypair may include both a private key and public key. As described herein, a private key may include a secret cryptographic key that only the owner, or in this case, the generating entity, should possess, while a public key is a related key that can be freely shared with anyone and is used to encrypt messages that can only be decrypted by the corresponding private key. As described herein, a private key value and public key value may include an alphanumeric string of any length. Keypairs can be generated using any suitable algorithm, including RSA, Elliptic Curve (EC), EdDSA, etc. In some embodiments, generation of the keypair may include random generation of a private key and derivation of the public key using the private key.

The service platform 150A may then transmit the public key it derived to the cross-platform access system 160, e.g., "transmit_public_key(public_key)," and the cross-platform access system 160 may be configured to generate its own keypair using the public key sent from the service platform 150A as a seed value. The service platform 150A may wait for a message from the cross-platform access system 160 indicating that the cross-platform access system has completed generating its own keypair, e.g., "message=await channel.recv( )" For example, the cross-platform access system 160 may transmit the public key it generated using the public key the service platform 150A generated (e.g., "(server_public_key)=message"). The service platform 150A may then create a key (e.g., Advanced Encryption Standard (AES) key) based on a service platform (e.g., client) generated private key and the cross-service access platform generated (e.g., server) public key. The created key (e.g., AES key) may also be referred to herein as a first service key.

AES may refer to a symmetric encryption algorithm that uses a same key for decryption and encryption. An AES key may include a randomly generated binary string of a fixed length that is used to encrypt and decrypt data securely. Typically AES is supported in three sizes, including 128-bit, 192-bit, and 256-bit. As described herein, the service platform 150A may create an AES key based on a service platform (e.g., client) generated private key and the cross-service access platform generated (e.g., server) public key (e.g., "AES_key=generate_key(private_key, server_public_key)"). The service platform 150A may do so by using a key derivation function (KDF) such as PBKDF2, bcrypt, Argon2, etc.

Service platform 150A may subsequently fetch the service account token "service_account_token=fetch( )" and encrypt the service account token with the key (e.g., AES key). A service account token, as referred to herein, may include an authentication credential used to grant access to specific services or resources. Unlike user tokens, which are tied to human users, the service account token may be limited to machine-to-machine communication between the cross-platform access system 160 and the service platform (e.g., service platform 150A). The service platform 150A may insert the encrypted service account token "encrypted_service_account_token=encrypt (service_account_token, server_public_key)" and the public key generated by the service platform 150A (e.g., "(private_key, public_key)=generate_keypair( )") into the authorization request. For example, the "client_pub_key" of authorization request 200 may be the public key generated by the service platform 150A while the "encrypted_service_account_token" may be the encrypted service account token.

As described herein, communication subsystem 162 of cross-platform access system 160 may be used to receive the authorization request. Communication subsystem 162 may include software components, hardware components, or a combination of both. For example, communication subsystem 162 may include a network card (e.g., a wireless network card and/or a wired network card) that is associated with software to drive the card. Communication subsystem 162 may pass at least a portion of the data, or a pointer to the data in memory, to other subsystems such as token decryption subsystem 164, service identity generation subsystem 166, service identity token generation subsystem 168, server token generation subsystem 170, and token encryption subsystem 172. Communication subsystem 162 may further be configured to transmit and receive other data such as for transmission of an encrypted usage token responsive to the request as described further herein.

The authorization request 200 may be passed, or a pointer to the data may be passed to the token decryption subsystem 164. The token decryption subsystem may extract the encrypted service account token and decrypt the encrypted service account token to obtain the service account token. In order to decrypt the encrypted service account token, the system may first generate a key to do so. According to some embodiments, the key may be generated to be identical to the first service key used to encrypt the service account token at the service platform. For example, the cross-platform access system 160 and service platform 150A may be enabled to generate the same service key (e.g., AES key)

even though they do not communicate the service key between them. In particular, the cross-platform access system 160 and service platform 150A may utilize Elliptic-Curve-Diffie-Hellman (ECDH) or other suitable alternatives (e.g., Diffie-Hellman Key Exchange (DHKE)) to securely establish a shared secret key over an insecure channel.

As described above, the service platform may generate its own private key initially "(private_key, public_key)=generate_keypair( )." As described herein, the process of generating the keypair may begin with generation of the private key, and the service platform may then derive a public key "public_key" by multiplying the private key with a known elliptic curve generator point. The public key may be transmitted to the cross-platform access system 160, "transmit_public_key (public_key)." The cross-platform access system 160 may generate its own keypair. In particular, the cross-platform access system 160 may generate its own private key and multiply using an elliptic curve generator point to generate its public key. The cross-platform access system 160 may transmit its public key to the service platform.

In this way, both the cross-platform access system 160 and the service platform 150A may have the other's public key, while keeping the private key generated thereon. For example, the cross-platform access system 160 may have the private key generated thereon and the public key generated on the service platform 150A. The service platform 150A may have access to the private key generated on the service platform and the public key generated on the cross-platform access system 160.

Since multiplication on elliptic curves is commutative, both parties derive the same shared key. In particular, as described with respect to FIG. 3A, the first service key independently generated on the service platform is generated using the private key generated on the service platform and the public key generated on the cross-platform access system 160. The second service key independently generated on the cross-platform access system 160 but having the same value as the first service key is generated using the private key generated on the cross-platform access system 160 and the public key generated on the service platform.

In particular, the second service key independently generated on the cross-platform access system 160 may be generated using process 310 illustrated in FIG. 3B. The cross-platform access system 160 may perform functions from subroutine_generate_second_service_key( ) to generate or otherwise obtain the second service key. In particular, the cross-platform access system 160 may first attempt to fetch the second service key, e.g., if the second service key is preexisting ("try: AES_key=fetch( )"). If the second service key cannot be fetched, the system may then attempt to generate the second service key by performing ECDH using its private key and the public key transmitted from the service platform, e.g., "AES_key=generate_key(server_private_key, client_pub_key)."

If doing so fails, it may mean that the cross-platform access system 160 did not generate and transmit its own keypair as described herein. Thus, the cross-platform access system 160 may generate its own keypair, e.g., "(server private_key, server_public_key)=generate_keypair(client_pub_key)" such as by using the service platform public key as a seed. The cross-platform access system 160 may then transmit the public key it generated to the service platform, e.g., "transmit_public_key(server_public_key)." Then the cross-platform access system 160 can generate the service key (e.g., AES key) as described herein. Once the service key is generated, the cross-platform access system 160 can cache the service key for future lookups (e.g., "cache (AES_key, client_pub_key)").

The token decryption subsystem 164 may use the second service key to decrypt the encrypted service token. As described herein, since the second service key has an equivalent value to the first service key independently generated by the cross-platform access system, the second service key can be used to decrypt the encrypted service account token, which was encrypted using the first service key generated at the service platform. For example, the service account token may be decrypted by reversing the encryption process. As described herein, the key may be an AES key, such that the same key may be used for encryption and decryption.

The token decryption subsystem 164 may pass the service account token, or a pointer to the data in memory, to the service identity generation subsystem 166. The service identity generation subsystem 166 may generate, based on the service account token, a service identity for the service. According to some embodiments, the service identity may include a cluster identifier, a name space, and a deployment name. The cluster identifier, name space, and deployment name may be retrieved from the service account token. As referred to herein, a cluster identifier may include a collection of computing resources such as servers, virtual machines, or containers that work together to run applications efficiently. A name space as referred to herein may include a logical separation within a cluster that helps to organize and isolate different workloads. A deployment name may refer to a unique identifier for a deployment resource within a namespace that allows management of the deployment in commands and configuration.

The service identity generation subsystem 166 may generate, for the service identity, a key identifier and an access key pair comprising a private access key and a public access key. According to some embodiments, the system may insert the private access key into a key vault associated with the service identity and cache the key identifier and the public access key. For example, the system may cache the keypair in a key management service (KMS) runtime and may generate a key identifier (KID) which can be used to identify the keypair during a lookup. The keypair may be generated using techniques described herein. The system may use communication subsystem 162 to insert the private key in the vault 180 with respect to the service identity (e.g., associated with the service identity). Alternatively or additionally, the system may use communication subsystem 162 to insert the KID, KMS generated public key, and the service identity into the database 130.

The private key, key identifier, cluster identifier, the name space, and/or the deployment name for the service may be passed from the service identity generation subsystem 166 to service identity token generation subsystem 168. Alternatively or additionally, a pointer to the data in memory may be passed. The service identity token generation subsystem 168 may use the data to generate a service identity token. For example, FIG. 4A illustrates an exemplary service identity token 400 for cross-platform authorization, in accordance with one or more embodiments of this disclosure. For example, the cluster identifier may be "cluster_3" referring to a $3^{rd}$ cluster from a plurality of clusters available. The name space "my-name-space" may refer to a name space within the third cluster. Deployment name "e-commerce service" may refer to the service that is deployed on the name space. In the example of FIG. 4A, the service may be for e-commerce. Exemplary service identity token 400 also includes, as described herein, the private access key and a key identifier.

The service identity token generation subsystem 168 may pass the service identity token, or a pointer to the data in memory, to server token generation subsystem 170. The server token generation subsystem 170 may generate a server token comprising access permissions for the service. As referred to herein, access permissions may define what entities may access a resource and what actions they can take. Permission levels may indicate who may read, write, execute, or delete on the resource. Role-based access control may assign permissions based on roles, such as for administrators, editors, viewers, or guests. Other access models include access control models such as Attribute-Based Access Control (ABAC) or Mandatory Access Control (MAC).

According to some embodiments, generating the service account token including the access permissions for the service may include retrieving the access permissions for the service and transforming the access permissions into token format. The server token generation subsystem 170 may then add the access permissions to the service account token, and thus into the server token. For example, token formats that may be used may include JSON Web Token (JWT), OAuth Access token, Kerberos Token, SAML token, etc. In one example, the token format is JWT format, and the token may include a claims section in the payload that specifies user roles, permissions, or scopes. An access permission such as "everyone has admin roles and should be able to read write and delete" can be transformed into the JWT token format to include, for example, "role: 'admin'" and "permissions: ['read', 'write', 'delete']." Transformation can be done using one or more algorithms, such as operator developed algorithms. Alternatively or additionally, the system may utilize machine learning to translate plaintext into token format. These permissions may be incorporated into the JWT in the payload section.

The server token generation subsystem 170 and/or service identity token generation subsystem 168 may pass the server token and the service identity token to the token encryption subsystem 172. Alternatively, or additionally, server token generation subsystem 170 and/or service identity token generation subsystem 168 may pass a pointer to the data in memory to the token encryption subsystem 172. The token encryption subsystem 172 may encrypt the server token and the service identity token using the second service key into an encrypted usage token. The server token generation subsystem 170 may pass the encrypted usage token to the communication subsystem 162 from which the encrypted usage token can be transmitted, such as to the requesting device (e.g., service platform 150A). As described herein, since the second service key generated at the cross-platform access system 160 is the same as the first service key generated independently at the service platform, the requesting device is enabled to decrypt the encrypted usage token using the first service key. FIG. 4B is an example of a usage token 410 (e.g., unencrypted). The usage token includes the service identity token 400 and additionally may include the server token including permissions, as described herein.

Thus, in future uses, when the cross-platform access system 160 receives a validation request for the service such as from a remote device, the cross-platform access system 160 may find the public access key associated with the service and provide it to the remote device so that the remote device may validate the service identity token. In particular, the validation request may include the key identifier and the service identity token. The cross-platform access system 160 may determine, based on the key identifier, the public access key associated with the service, such as through a lookup as described herein. The cross-platform access system 160 may then transmit the public access key associated with the service to the remote device via communication subsystem 162.

According to some embodiments, the system may determine that the key identifier is not found in cache memory. For example, a cache lookup may yield a cache miss indicating that the data is not found in the cache. In this case, the system may generate a vault request for the public access key, wherein the vault request includes the key identifier. The vault request may be transmitted via communication subsystem 162 to vault 180. The vault may identify the public access key and transmit it to cross-platform access system 160. Communication subsystem 162 may receive the public access key from the key vault and cache the public access key and the key identifier in the cache memory.

According to some embodiments, a service may seek to refresh a usage token such as when the service platform identifies that a usage token is close to expiration. For example, generating the server token comprising the access permissions for the service may further include receiving a token refresh request comprising the encrypted service account token and the client (e.g., service) public key. The token decryption subsystem 164 may be configured to decrypt the encrypted service account token to retrieve the service identity and generate a new key identifier and a new service identity token using the client public key. The communication subsystem 162 may then transmit the new service identity token and the new key identifier to the requesting device, e.g., the service platform 150A. In some examples, determining that the usage token is close to expiration may include determining that the usage token was generated more than a predetermined amount of time in the past.

Figure 5:
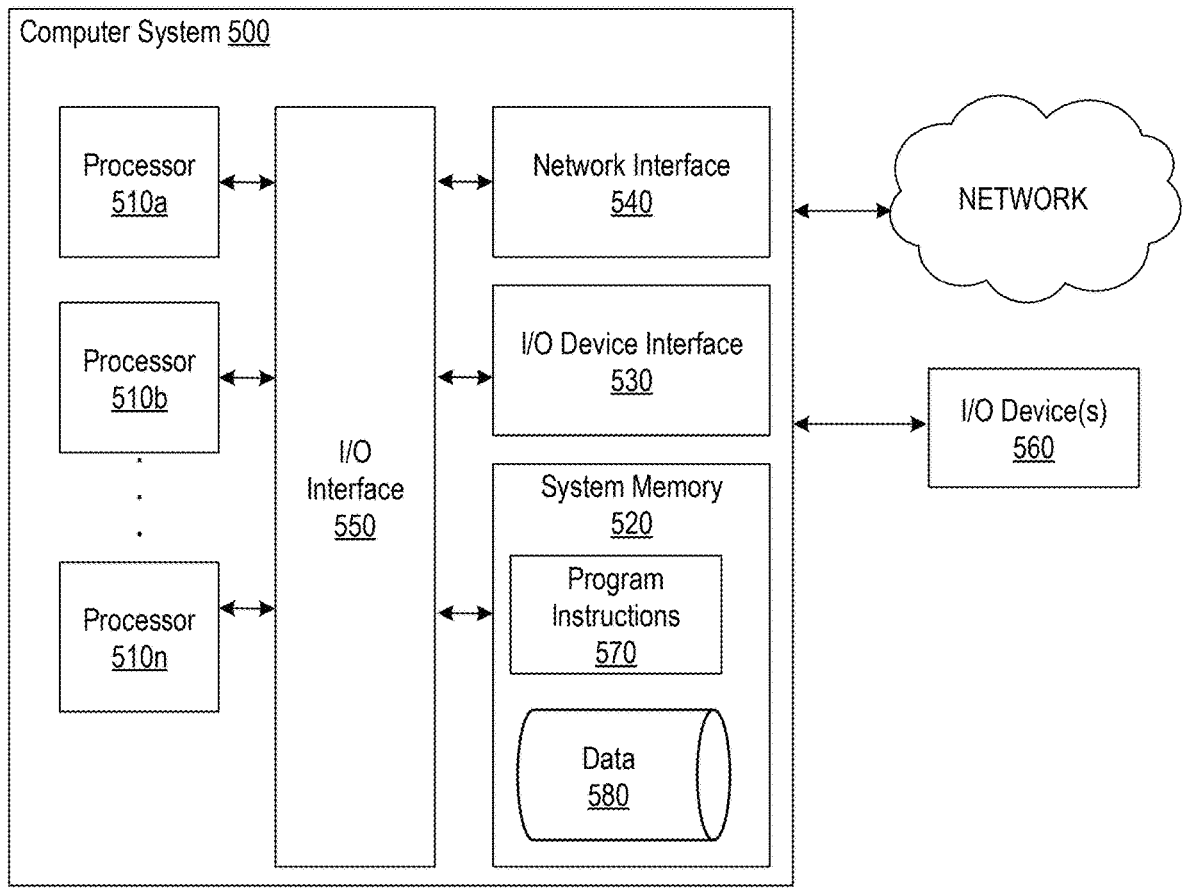
FIG. 5 illustrates a computing system that can be used for cross-platform authorization, in accordance with one or more embodiments of this disclosure.

FIG. 5 shows an example computing system that may be used in accordance with some embodiments of this disclosure. In some instances, computing system 500 is referred to as a computer system 500. A person skilled in the art would understand that those terms may be used interchangeably. The components of FIG. 5 may be used to perform some or all operations discussed in relation to FIGS. 1-4. Furthermore, various portions of the systems and methods described herein may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an input/output (I/O) device interface 530, and a network interface 540 via an I/O interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 500. A processor may execute code (e.g., processor firmware, a protocol stack, a database management system, an operating system, or a combination thereof) that creates an execution environment for program instructions.

A processor may include a programmable processor. A processor may include general or special purpose microprocessors. A processor may receive instructions and data from a memory (e.g., system memory 520). Computing system 500 may be a uni-processor system including one processor (e.g., processor 510a), or a multiprocessor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer systems, for example, may be connected to computer system 500 via a network and network interface 540.

The I/O device interface 530 and I/O devices 560 may be used to enable manipulation of the three-dimensional model as well. For example, the user may be able to use I/O devices such as a keyboard and touchpad to indicate specific selections for nodes, adjust values for nodes, select from the history of machine learning models, select specific inputs or outputs, and/or the like. Alternatively or additionally, the user may use their voice to indicate specific nodes, specific models, and/or the like via the voice recognition device and/or microphones.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the internet, a LAN, a WAN, a cellular communications network, or the like.

System memory 520 may be configured to store program instructions 570 or data 580. Program instructions 570 may be executable by a processor (e.g., one or more of processors 510a-510n) to implement one or more embodiments of the present techniques. Program instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages.

A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 520 may include a non-transitory, computer-readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 500 may also be connected to other devices that are not illustrated or may operate as a stand-alone system. In addition, the functionality provided by the illustrated components may, in some embodiments, be combined in fewer components, or be distributed in additional components. Similarly, in some embodiments, the functionality of some of the illustrated components may not be provided, or other additional functionality may be available.

Figure 6:
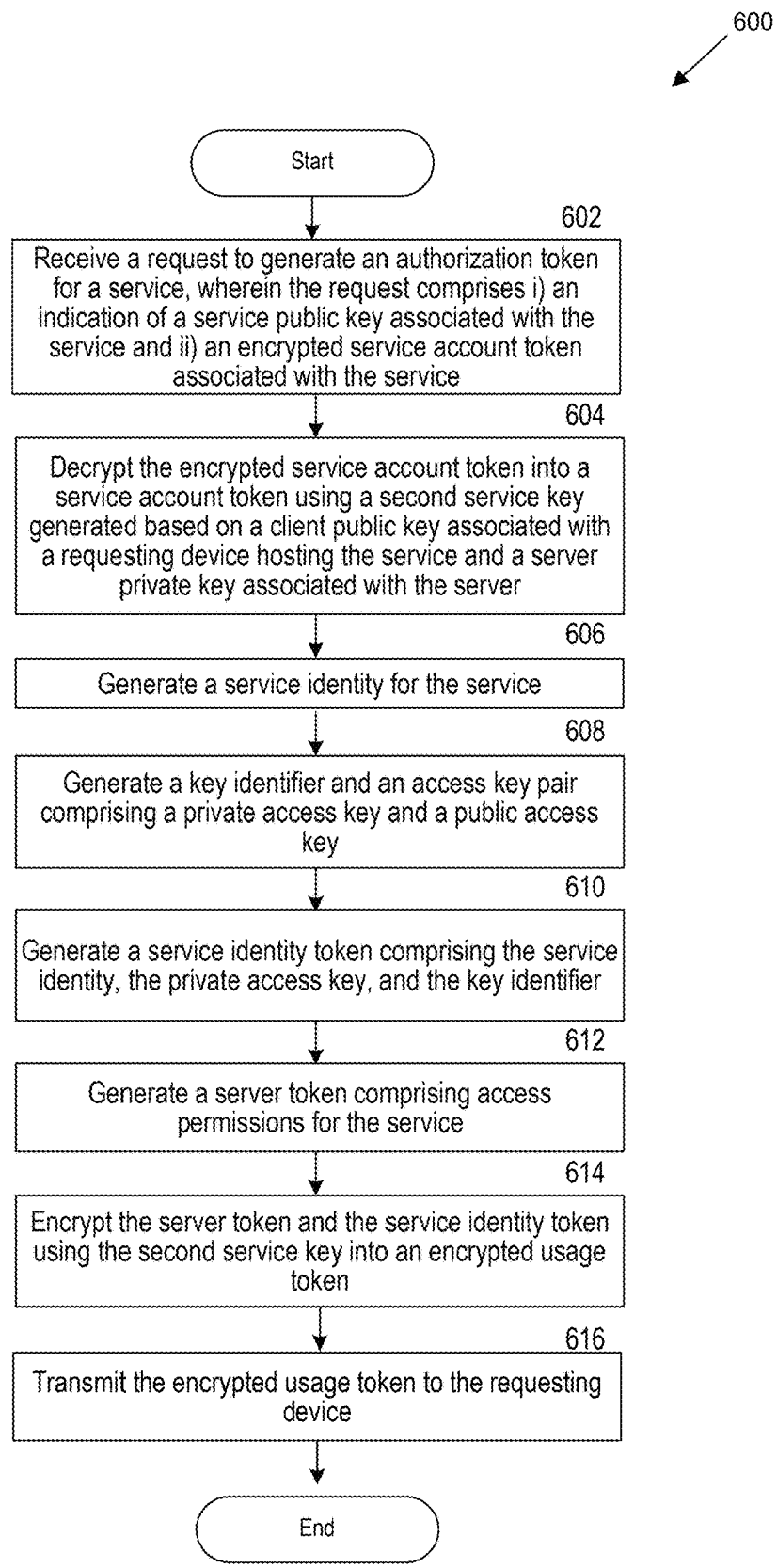
FIG. 6 is a flowchart of operations for cross-platform authorization, in accordance with one or more embodiments of this disclosure.

FIG. 6 is a flowchart 600 of operations for cross-platform access control, in accordance with one or more embodiments of this disclosure. The operations of FIG. 6 may use components described in relation to FIG. 5. In some embodiments, cross-platform access system 160 may include one or more components of computer system 500.

At operation 602, one or more of processors 510a-510n may be used to receive a request to generate an authorization token for a service, wherein the request comprises i) an indication of a service public key associated with the service and ii) an encrypted service account token associated with the service. One or more of processors 510a-510n may receive such requests over communication network 140 using network interface 540.

At operation 604, one or more of processors 510a-510n may further decrypt the encrypted service account token into a service account token using a second service key generated based on a client public key associated with a requesting device hosting the service and a server private key associated with the server. At operation 606, one or more of processors 510a-510n may generate a service identity for the service. According to some embodiments, the processor(s) may perform the generation based on the service account token. The service identity may include a cluster identifier, a name space, and a deployment name.

At operation 608, one or more of processors 510a-510n may generate a key identifier and an access key pair comprising a private access key and a public access key. For example, the processor(s) may generate the identifier and key pair for the service identity. At operation 610, one or more of processors 510a-510n may generate a service identity token comprising the service identity, the private access key, and the key identifier. Further, at operation 612, the processor(s) may generate a server token comprising access permissions for the service.

At operation 614, one or more of processors 510a-510n may encrypt the server token and the service identity token using the second service key into an encrypted usage token. At operation 616, one or more of processors 510a-510n may transmit the encrypted usage token to the requesting device. According to some embodiments, the requesting device may be configured to decrypt the encrypted usage token using a first service key.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

A1. A method comprising: receiving, at a server, an authorization request to generate an authorization token for a service, wherein the authorization request comprises i) an indication of a service public key associated with the service and ii) an encrypted service account token associated with the service, wherein the encrypted service account token is generated by encrypting a service account token using a first service key generated based on a client private key and a server public key, and wherein the client private key is associated with a requesting device hosting the service; decrypting, using a second service key, the encrypted service account token, wherein the second service key is generated based on a client public key associated with the requesting device hosting the service and a server private key associated with the server; generating, based on the service account token, a service identity for the service, wherein the service identity comprises a cluster identifier, a name space, and a deployment name, wherein the cluster identifier, the name space, and the deployment name are retrieved from the service account token; generating, for the service identity, a key identifier and an access key pair comprising a private access key and a public access key; generating a service identity token comprising the service identity, the private access key, and the key identifier; generating a server token comprising access permissions for the service; encrypting the server token and the service identity token using the second service key into an encrypted usage token; and transmitting the encrypted usage token to the requesting device, the requesting device being configured for decrypting the encrypted usage token using the first service key.

A2. A method comprising: receiving, at a server, an authorization request to generate an authorization token for a service, wherein the authorization request comprises i) an indication of a service public key associated with the service and ii) an encrypted service account token associated with the service; decrypting, using a second service key, the encrypted service account token into a service account token, wherein the second service key is generated based on a client public key associated with a requesting device hosting the service and a server private key associated with the server; generating, based on the service account token, a service identity for the service; generating, for the service identity, a key identifier and an access key pair comprising a private access key and a public access key; generating a service identity token comprising the service identity, the private access key, and the key identifier; generating a server token comprising access permissions for the service; encrypting the server token and the service identity token using the second service key into an encrypted usage token; and transmitting the encrypted usage token to the requesting device, the requesting device being configured for decrypting the encrypted usage token using a first service key.

A3. The method of any of the preceding embodiments, wherein the encrypted service account token is encrypted using the first service key generated based on a client private key and a server public key, and wherein the client private key is associated with the requesting device hosting the service.

A4. The method of any of the preceding embodiments, wherein the service identity comprises a cluster identifier, a name space, and a deployment name, wherein the cluster identifier, the name space, and the deployment name are retrieved from the service account token.

A5. The method of any of the preceding embodiments, further comprising: inserting the private access key into a key vault associated with the service identity; and caching the key identifier and the public access key.

A6. The method of any of the preceding embodiments, further comprising determining that the key identifier is not found in cache memory; generating a vault request for the public access key, wherein the vault request comprises the key identifier; receiving the public access key from the key vault; and caching the public access key and the key identifier in the cache memory.

A7. The method of any of the preceding embodiments, further comprising: receiving from a remote device a validation request for the service, wherein the validation request comprises the key identifier and the service identity token; determining, based on the key identifier, the public access key associated with the service; and transmitting the public access key associated with the service to the remote device, wherein the remote device uses the public access key to validate the service identity token.

A8. The method of any of the preceding embodiments, wherein generating the server token comprising the access permissions for the service further comprises: receiving a token refresh request comprising the encrypted service account token and the client public key; decrypting the encrypted service account token to retrieve the service identity; generating a new key identifier and a new service identity token using the client public key; and transmitting the new service identity token and the new key identifier to the requesting device.

A9. The method of any of the preceding embodiments, wherein generating the server token comprising the access permissions for the service further comprises: retrieving the access permissions for the service; transforming the access permissions into token format; and adding the access permissions to the server token.

A10. One or more tangible, non-transitory, computer-readable media storing instructions that, when executed by a data processing apparatus, cause the data processing apparatus to perform operations comprising those of any of embodiments A1-9.

A11. A system comprising: one or more processors; and memory storing instructions that, when executed by the one or more processors, cause the processors to effectuate operations comprising those of any of embodiments A1-9.

A12. A system comprising means for performing any of embodiments A1-9.

A13. A system comprising cloud-based circuitry for performing any of embodiments A1-9.

What is claimed is:

1. A system for enabling access across platforms, the system comprising:
    one or more processors; and
    one or more non-transitory, computer-readable storage media storing instructions, which when executed by the one or more processors cause the one or more processors to perform operations comprising:
        receiving, at a server, an authorization request to generate an authorization token for a service, wherein the authorization request comprises i) an indication of a service public key associated with the service and ii) an encrypted service account token associated with the service, wherein the encrypted service account token is generated by encrypting a service account token using a first service key generated based on a client private key and a server public key, and wherein the client private key is associated with a requesting device hosting the service;
        decrypting, using a second service key, the encrypted service account token, wherein the second service key is generated based on a client public key associated with the requesting device hosting the service and a server private key associated with the server;
        generating, based on the service account token, a service identity for the service, wherein the service identity comprises a cluster identifier, a name space, and a deployment name, wherein the cluster identifier, the name space, and the deployment name are retrieved from the service account token;
        generating, for the service identity, a key identifier and an access key pair comprising a private access key and a public access key;
        generating a service identity token comprising the service identity, the private access key, and the key identifier;
        generating a server token comprising access permissions for the service;
        encrypting the server token and the service identity token using the second service key into an encrypted usage token; and
        transmitting the encrypted usage token to the requesting device, the requesting device being configured for decrypting the encrypted usage token using the first service key.

2. The system of claim 1, wherein the instructions further cause the one or more processors to perform operations comprising:
    inserting the private access key into a key vault associated with the service identity; and
    caching the key identifier and the public access key.

3. The system of claim 2, wherein the instructions further cause the one or more processors to perform operations comprising:
    determining that the key identifier is not found in cache memory;
    generating a vault request for the public access key, wherein the vault request comprises the key identifier;
    receiving the public access key from the key vault; and
    caching the public access key and the key identifier in the cache memory.

4. The system of claim 1, wherein the instructions further cause the one or more processors to perform operations comprising:
    receiving, from a remote device, a validation request for the service, wherein the validation request comprises the key identifier and the service identity token;
    identifying, based on the key identifier, the public access key associated with the service; and
    transmitting the public access key associated with the service to the remote device, wherein the remote device uses the public access key to validate the service identity token.

5. The system of claim 1, wherein the instructions for generating the server token comprising the access permissions for the service further cause the one or more processors to perform operations comprising:
    receiving a token refresh request comprising the encrypted service account token and the client public key;
    decrypting the encrypted service account token to retrieve the service identity;

generating a new key identifier and a new service identity token using the client public key; and transmitting the new service identity token and the new key identifier to the requesting device.

6. The system of claim 1, wherein the instructions for generating the server token comprising the access permissions for the service further cause the one or more processors to perform operations comprising:

retrieving the access permissions for the service;

transforming the access permissions into token format; and adding the access permissions to the server token.

7. A method for cross-platform authorization, the method comprising:

receiving, at a server, an authorization request to generate an authorization token for a service, wherein the authorization request comprises i) an indication of a service public key associated with the service and ii) an encrypted service account token associated with the service, wherein the encrypted service account token is generated by encrypting a service account token using a first service key generated based on a client private key and a server public key, and wherein the client private key is associated with a requesting device hosting the service;

decrypting, using a second service key, the encrypted service account token into a service account token, wherein the second service key is generated based on a client public key associated with the requesting device hosting the service and a server private key associated with the server;

generating, based on the service account token, a service identity for the service, wherein the service identity comprises a cluster identifier, a name space, and a deployment name, wherein the cluster identifier, the name space, and the deployment name are retrieved from the service account token;

generating, for the service identity, a key identifier and an access key pair comprising a private access key and a public access key;

generating a service identity token comprising the service identity, the private access key, and the key identifier;

generating a server token comprising access permissions for the service;

encrypting the server token and the service identity token using the second service key into an encrypted usage token; and transmitting the encrypted usage token to the requesting device, the requesting device being configured for decrypting the encrypted usage token using the first service key.

8. The method of claim 7, further comprising:

inserting the private access key into a key vault associated with the service identity; and caching the key identifier and the public access key.

9. The method of claim 8, further comprising:

determining that the key identifier is not found in cache memory;

generating a vault request for the public access key, wherein the vault request comprises the key identifier;

receiving the public access key from the key vault; and caching the public access key and the key identifier in the cache memory.

10. The method of claim 7, further comprising:

receiving from a remote device a validation request for the service, wherein the validation request comprises the key identifier and the service identity token;

determining, based on the key identifier, the public access key associated with the service; and transmitting the public access key associated with the service to the remote device, wherein the remote device uses the public access key to validate the service identity token.

11. The method of claim 7, wherein generating the server token comprising the access permissions for the service further comprises:

receiving a token refresh request comprising the encrypted service account token and the client public key;

decrypting the encrypted service account token to retrieve the service identity;

generating a new key identifier and a new service identity token using the client public key; and transmitting the new service identity token and the new key identifier to the requesting device.

12. The method of claim 7, wherein generating the server token comprising the access permissions for the service further comprises:

retrieving the access permissions for the service;

transforming the access permissions into token format; and adding the access permissions to the server token.

13. One or more non-transitory, computer-readable storage media storing instructions that when executed by one or more processors cause the one or more processors to perform operations comprising:

receiving, at a server, an authorization request to generate an authorization token for a service, wherein the authorization request comprises an indication of i) a service public key associated with the service and ii) an encrypted service account token associated with the service, wherein the encrypted service account token is generated by encrypting a service account token using a first service key generated based on a client private key and a server public key, and wherein the client private key is associated with a requesting device hosting the service;

decrypting, using a second service key, the encrypted service account token into a service account token, wherein the second service key is generated based on a client public key associated with the requesting device hosting the service and a server private key associated with the server;

generating, based on the service account token, a service identity for the service, wherein the service identity comprises a cluster identifier, a name space, and a deployment name, wherein the cluster identifier, the name space, and the deployment name are retrieved from the service account token;

generating, for the service identity, a key identifier and an access key pair comprising a private access key and a public access key;

generating a service identity token comprising the service identity, the private access key, and the key identifier;

generating a server token comprising access permissions for the service;

encrypting the server token and the service identity token using the second service key into an encrypted usage token; and transmitting the encrypted usage token to the requesting device, the requesting device being configured for decrypting the encrypted usage token using the first service key.

14. The one or more non-transitory, computer-readable storage media of claim 13, wherein the instructions further cause the one or more processors to perform operations comprising:
    inserting the private access key into a key vault associated with the service identity; and
    caching the key identifier and the public access key.

15. The one or more non-transitory, computer-readable storage media of claim 14, wherein the instructions further cause the one or more processors to perform operations comprising:
    determining that the key identifier is not found in cache memory;
    generating a vault request for the public access key, wherein the vault request comprises the key identifier;
    receiving the public access key from the key vault; and
    caching the public access key and the key identifier in the cache memory.

16. The one or more non-transitory, computer-readable storage media of claim 15, wherein the instructions further cause the one or more processors to perform operations comprising:
    receiving from a remote device a validation request for the service, wherein the validation request comprises the key identifier and the service identity token;
    determining, based on the key identifier, the public access key associated with the service; and
    transmitting the public access key associated with the service to the remote device, wherein the remote device uses the public access key to validate the service identity token.

\* \* \* \* \*